United States Patent [19]

Tétreault

[11] Patent Number: 4,768,806
[45] Date of Patent: Sep. 6, 1988

[54] COLLAPSIBLE TRAILER

[76] Inventor: Fernand L. Tétreault, 719, du Parc, Valcourt, J0E 2L0, Canada

[21] Appl. No.: 35,916

[22] Filed: Apr. 8, 1987

[30] Foreign Application Priority Data

Jan. 5, 1987 [GB] United Kingdom ............... 8700054

[51] Int. Cl.$^4$ .............................................. B62B 1/04
[52] U.S. Cl. ................................... 280/656; 280/725; 296/182
[58] Field of Search .................. 280/639, 39, 40, 656, 280/725; 296/174, 27, 182

[56] References Cited

U.S. PATENT DOCUMENTS

| 3,123,378 | 3/1964 | Caldwell | 280/701 X |
| 4,148,498 | 4/1979 | Taylor, Jr. | 280/701 X |
| 4,253,677 | 3/1981 | Wissler | 280/40 |
| 4,480,851 | 11/1984 | St. Pierre | 280/656 |

FOREIGN PATENT DOCUMENTS 2132570 7/1984 United Kingdom ............... 280/656

Primary Examiner—John J. Love
Assistant Examiner—Michael Mar
Attorney, Agent, or Firm—Roland L. Morneau

[57] ABSTRACT

A collapsible trailer having a platform made of two longitudinal sections which folds against each other along its central longitudinal axis. Two lateral panels are hingely mounted on each side of the platform to fold over the platform. Removable front and rear panels maintain the lateral panels in their upright position and prevent the platform from folding. Flanges along the longitudinal axis of the platform abut against each other to keep the platform flat in its load carrying position. Beams along the lateral sides of the platform also abut against beams secured to the lower edge of the lateral panels to keep the panels from collapsing outwardly. A towing bar is hingely mounted to the front of the platform for collapsing against the latter. A wheel is resiliently mounted under each lateral panel.

3 Claims, 3 Drawing Sheets

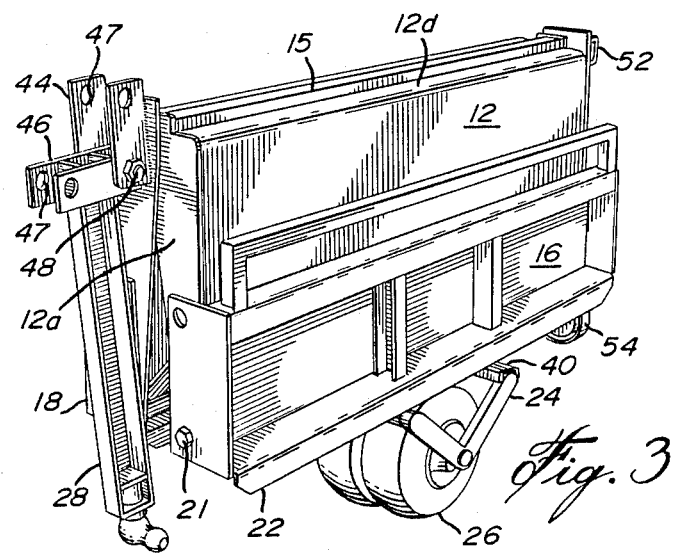
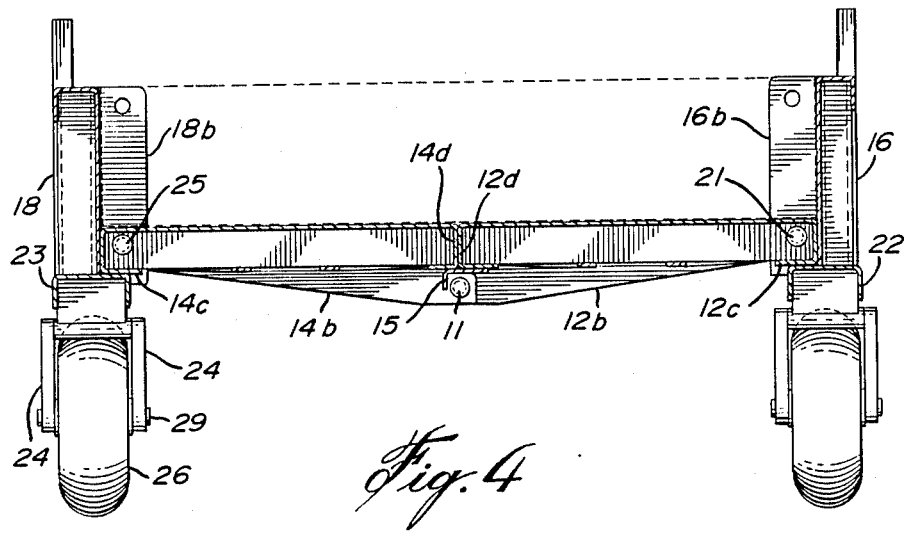

4,768,806

COLLAPSIBLE TRAILER

BACKGROUND OF THE INVENTION

Canadian Pat. No. 252,506 issued to A. G. Gleissner describes a collapsible trailer which requires a complex arrangement of multiple parts. The wheels are joined by an axle connected to the body of the trailer by a combination of leaf springs and spring brackets requiring the use of bolts and nuts.

Canadian Pat. No. 429,762 issued to T. R. Black discloses a collapsible vehicle having wheel units spaced from the side of an intermediate frame, flexible members connecting the wheel units to a tongue extending in front of the intermediate frame and clamping arrangements for bracing the flexible parts.

BRIEF SUMMARY OF THE INVENTION

The present invention is directed to a collapsible trailer which can be easily and quickly folded. It comprises no bolts, nor screws and is very solid in its load carrying position and is very compact in its folded position.

The trailer comprises a platform made of two longitudinal sections hingely mounted about a central axis, a lateral panel hingely mounted on each outer side of each of the longitudinal sections and adapted to be folded over the upper surface of the platform. A front and rear panel are removably mounted on the platform and extend between both lateral panels to which they can be removably secured. A wheel supporting frame and a wheel are fixed under each lateral panel. The supporting frame has a V-shape and is pivotally secured at one upper end and resiliently fixed at the other end.

BRIEF DESCRIPTION OF THE DRAWING

FIG. 3 is a perspective view of the trailer shown from above completely folded including the towing bar, FIG. 4 is a transversal-sectional view of the trialer looking backward without the rear panel.

DETAILED DESCRIPTION

Figure 1:
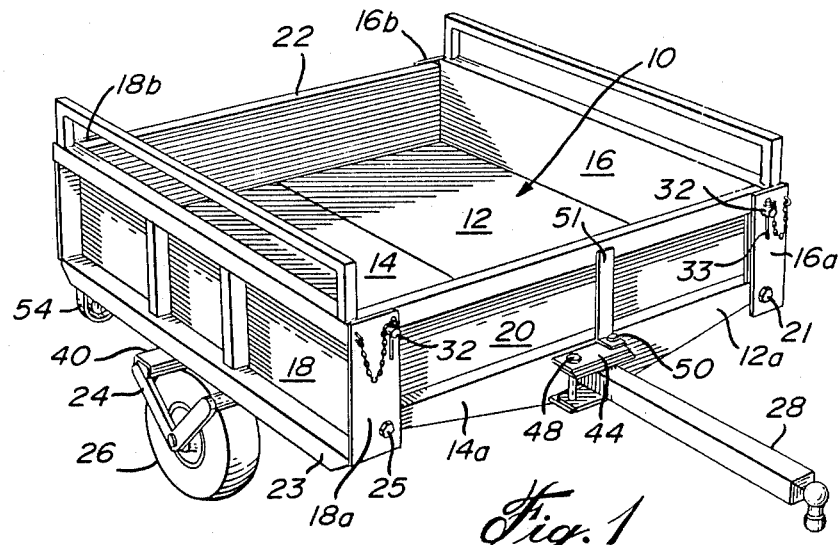
FIG. 1 is a perspective view of the collapsible trailer according to the invention in its load carrying position.

The trailer, as shown in FIG. 1, in its load carrying position, has a platform 10 comprising two longitudinal sections 12 and 14. Two lateral panels 16 and 18 are pivotally mounted on the outer side of each longitudinal sections 12 and 14. Front and rear panels 20 and 22 extend between the lateral panels 16 and 18 and prevent the latter from collapsing inwardly. Under each lateral panel, a generally V-shaped frame 24 is hingely fixed and rotatably support a wheel 26 on an axle 29 located about the apex of said V-shaped frame.

The trailer is pulled by a towing bar 28 pivotally secured to longitudinal section 14 and is locked to the other secton 12. The towing bar extends in the direction of the central axis formed by the intersection of the two longitudinal sections.

Figure 2:
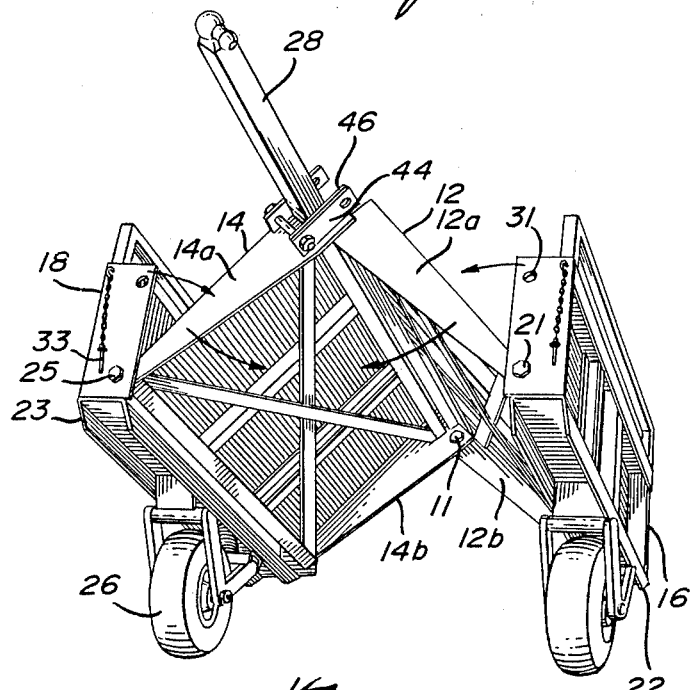
FIG. 2 is a perspective view of the trailer partly folded, with the front and rear panels removed.

FIG. 2 shows the trailer according to FIG. 1 in which the front and rear panels 20 and 22 have been removed to allow longitudinal sections 12 and 14 to partly fold and the lateral panels 16 and 18 to partly collapse over sections 12 and 14.

In FIG. 3, the trailer is completely folded. The lateral panels 16 and 18 and the two longitudinal sections 12 and 14 are substantially parallel and the towing bar 28 extends downwardly in front of the trialer and against front edge of the longitudinal sections 12 and 14.

A specific description of the construction of the various parts of the trialer and their relative movements will now be explained by referring irrespectively to FIGS. 1 to 6.

The longitudinal section 12 has a front flange 12a and a rear flange 12b and the longitudinal section 14 has also a front flange 14a and a rear flange 14b. Flanges 12a and 14a pivots about the axle 13 and flanges 12b and 14b pivot about the axle 11. The outer and central lateral sides of section 12 are reinforced by C-shaped flanges 12c and 12d and similarly flanges 14c and 14d reinforce sections 14.

When the trailer is in its load carrying position as in FIG. 1, the two C-shaped flanges 12d and 14d abut against each other by their flat base. It should be obvious that the C-shape has an orthogonal configuration. When the trailer is folded, the flanges spread apart due to the rotation of the sections 12 and 14 about the axles 11 and 13. The C-shaped flanges 12d and 14d have the double functions of reinforcement and abutment. An L-shaped flange 15 is welded under flange 12d (see FIG. 4) to close any gap which may exist between flanges 12d and 14d and to add resistance to the platform 10.

Figure 5:
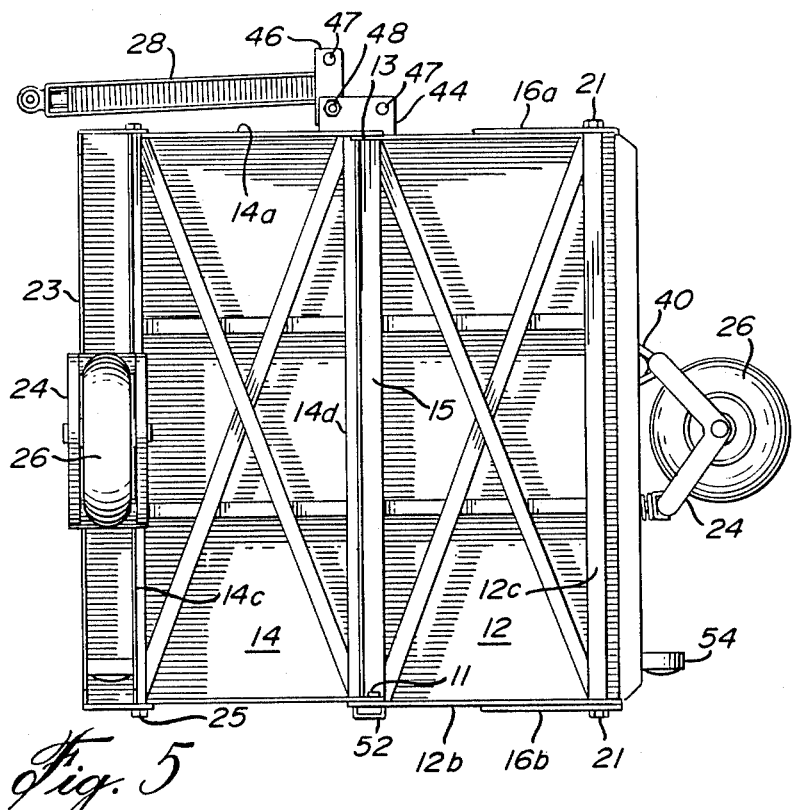
FIG. 5 is a bottom view of the trailer with one lateral panel and the towing bar folded.
Figure 6:
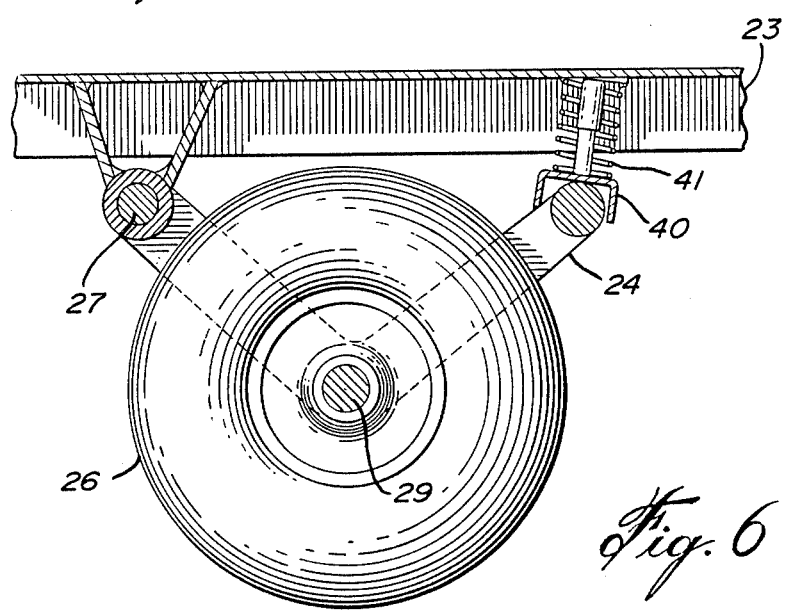
FIG. 6 is a vertical-sectionnal view of the wheel suspension arrangement.

Lateral panel 16 is provided at each end with shoulder plates 16a and 16b and is reinforced along its lower surface by an inverted U-shaped beam 22. Lateral panel 18 is similarly provided with shoulder plates 18a and 18b and with an inverted U-shaped beam 23. The shoulder plate 16a with panel 16 pivot about flange 12a around axle 21 and plate 18a with panel 18 pivot about flange 14a around axle 25. the same pivoting action takes place at the rear end of the trailer. In its load carrying position, as in FIG. 1, the inverted U-shaped beam 22 abut sideways against the base of the C-shaped flange 12c. Beams 22 and 12c have the double functions of reinforcement and abutment. It should be obvious that U-shaped flanges in general could be replaced by L-shaped flanges when reduced reinforcement is sufficient. For the same reason, the longitudinal sections 12 and 14 can be reinforced underneath by transverse and-/or cross-bars as shown in FIGS. 2 and 5.

In order to prevent the folding of the two longitudinal sections 12 and 14 and the lateral panels 16 and 18, and maintain the trailer in its load carrying position, front and rear panels 20 and 22 are inserted between the lateral panels 16 and 18. They are essentially rectangular and dimensioned to maintain the lateral panels in an erect position.

Each panel 20 and 22 has a pair of pegs 32 adapted to fit through openings provided in each of the shoulder plates 16a and 18a. Each peg is perforated to received a clip 33 which locks the peg 32 in each of the four shoulder plates. These pegs 32 prevent the front and rear panels 20 and 22 from lifting and consequently prevent the longitudinal sections from folding.

The wheels 26 are rotatably mounted between a pair of V-shaped frames 24. The front upper ends of the frames 24 are pivotally fixed to the U-shaped beams 22 and 23 about an axle 27. The rear upper ends of the frames 24 are joined by a brace 40. A shock absorber 41 is connected between the brace 40 and the bottom of the inverted U-shaped beam 26 (see FIG. 6). The same arrangement is foreseen for both sides of the trailer.

The towing bar 28 is also mounted to be folded. A U-shaped bracket 44 disposed horizontally is welded at one end to the front flange 14a, the other end extending over the front flange 12a. The rear of the towing bar 28 is welded to a U-shaped member 46 and dimensioned to freely slide through the bracket 44. The towing bar 28 pivots about an axle 48 going through the bracket 44 and member 46.

The axle 48 is lined up with the portion of the bracket 44 welded to the front flange 14a. The portion of the bracket 44 and the member 46 facing the front flange 12a has aligned perforations 47 therethrough to receive a pin 50 which locks the bar 28 in its towing position. The front panel 20 has a vertical brace 51 which extends over the bracket 44 and in line with the perforations 47. The brace 51 has a perforations in line with perforations 47. The pin 50 locks the brace 51 to the bracket 44 and member 46 and prevents the front panel 20 from bending forward or rearward under extra load. The rear panel 22 has also a vertical brace which is adapted to slide in slot 52 (see FIG. 5) secured to flange 12b.

Signaling reflectors 54 are secured to the U-shaped beams 22 and 23, behind the wheels 26.

The procedure for folding the trailer is usually initiated by removing the pin 50 which permits the folding of the towing bar 28 against the front flange 14a. Afterwards, the trailer is tilted backwards and the front and rear panels 20 and 22 removed. The two longitudinal sections 12 and 14 and the lateral panels 16 and 18 are bushed against each other as shown in FIG. 2 while the trailer is tilted further back to release some weight from the wheels. When the trailer is completely collapsed, it is brought back horizontally on its wheels and can be moved easily to a relatively small storing space.

I claim:

1. A collapsible vehicle trailer comprising a flat platform made of two longitudinal sections hingely mounted to one another along a central axis of the platform, each of said sections having a longitudinal central C-shaped flange adapted to abut against each other in their load carrying position, an L-shaped flange secured under one of the said central flanges and abuting against the other central flange in its load carrying position, lateral flanges on each outer side of said sections, the said lateral flanges having a C-shaped cross-section, each of said longitudinal sections having a front and rear flange, the front flanges of both longitudinal sections overlapping each other across the central axis of the platform, the rear flanges of both longitudinal sections also overlapping each other across the central axis, said front and rear flanges being hingely mounted separately and respectively on a front and rear axle, a lateral panel hingely mounted on each side of said platform, each of said lateral panels having a reversed U-shaped beam rigidly fixed to and below said lateral panel and adapted to abut against the said lateral C-shaped flanges when the platform is in its load carrying position, each of said lateral panels having a shoulder portion extending in the direction of the said platform and overlapping said front and rear flanges, each shoulder portion being hingely mounted on an axle through the adjacent front and rear flanges, a front and rear panel removably mounted over the front and rear end of said platform, each end of said front and rear panels abutting against said lateral panel for preventing the latter from collapsing inwardly towards said platform, means for retaining said front and rear panels to said lateral panels and for maintaining the said two longitudinal sections in the same plane, a wheel and wheel suspension means axially aligned with and fixed under each of said reversed U-shaped beams below said panels and extending substantially within the cross-section of said reversed U-shaped beams, and towing means fixed to said platform for pulling said trailer, the bottom surfaces of said longitudinal sections being reinforced by transversal and diagonal cross-bars.

2. A trailer as recited in claim 1, wherein the said means for retaining said front and rear panels comprise pegs secured in said front and rear panels extending through openings in said shoulder portions for preventing said longitudinal sections from folding.

3. A trailer as recited in claim 1, wherein said means for pulling said trailer comprises a towing bar pivotally mounted on said front flange of one of said longitudinal sections to move in a plane substantially parallel to the platform, locking means fixed on the front flange of the other of said longitudinal sections for securing the said towing bar in a direction corresponding to the said central axis.

* * * * *